United States Patent
Lin et al.

(10) Patent No.: US 8,947,060 B2
(45) Date of Patent: Feb. 3, 2015

(54) REGULATOR OVER-VOLTAGE PROTECTION CIRCUIT WITH REDUCED STANDBY CURRENT

(75) Inventors: Da Song Lin, Shenzhen (CN); Ni Zeng, Shenzhen (CN); Gang Zha, Shenzhen (CN); Xianfeng Xiong, Shenzhen (CN); Yiwei Zhang, Shanghai (CN)

(73) Assignee: STMicroelectronics (Shenzhen) R&D Co., Ltd., Shenzhen (CN)

( * ) Notice: Subject to any disclaimer, the term of this patent is extended or adjusted under 35 U.S.C. 154(b) by 895 days.

(21) Appl. No.: 12/953,392

(22) Filed: Nov. 23, 2010

(65) Prior Publication Data
US 2011/0156688 A1    Jun. 30, 2011

(30) Foreign Application Priority Data
Dec. 28, 2009   (CN) .......................... 2009 1 0265273

(51) Int. Cl.
G05F 1/00    (2006.01)
H02M 1/32    (2007.01)
H02M 3/00    (2006.01)

(52) U.S. Cl.
CPC . *H02M 1/32* (2013.01); *H02M 3/00* (2013.01)
USPC ........................................... 323/273; 323/280

(58) Field of Classification Search
USPC ............................ 323/273–281, 312–314, 317
See application file for complete search history.

(56) References Cited

U.S. PATENT DOCUMENTS

| | | | |
|---|---|---|---|
| 5,648,718 A * | 7/1997 | Edwards | 323/280 |
| 6,300,749 B1 * | 10/2001 | Castelli et al. | 323/273 |
| 6,420,857 B2 * | 7/2002 | Fukui | 323/280 |
| 6,456,058 B1 * | 9/2002 | Zha | 324/103 P |
| 6,600,299 B2 * | 7/2003 | Xi | 323/280 |
| 6,946,821 B2 * | 9/2005 | Hamon et al. | 323/273 |
| 7,323,854 B2 * | 1/2008 | Ritter | 323/280 |
| 7,405,546 B2 * | 7/2008 | Amrani et al. | 323/273 |
| 7,508,176 B2 * | 3/2009 | Hartular et al. | 323/268 |
| 7,525,350 B2 * | 4/2009 | Zeng et al. | 327/78 |
| 7,573,246 B2 * | 8/2009 | Lin et al. | 323/273 |
| 7,893,670 B2 * | 2/2011 | Pulijala et al. | 323/273 |
| 7,956,589 B1 * | 6/2011 | Fan | 323/280 |
| 2007/0188155 A1 * | 8/2007 | Oki et al. | 323/280 |
| 2007/0279024 A1 * | 12/2007 | Falvey et al. | 323/280 |

(Continued)

OTHER PUBLICATIONS

"MOST power management device (PMD)," STMicroelectronics L5961, Jan. 2008, Rev 1, pp. 1-7.
"STMicroelectronics Announces Integrated Power-Management Chip for Multimedia Networking in Cars," STMicroelectronics, Geneva, Mar. 7, 2008, 2 pages.

(Continued)

*Primary Examiner* — Jue Zhang
(74) *Attorney, Agent, or Firm* — Slater & Matsil, L.L.P.

(57) ABSTRACT

An embodiment of the invention relates to a power converter formed with an error amplifier and a related method. In an embodiment, a first switch is coupled in series with an error amplifier compensation capacitor. Upon detection of a current level greater than a threshold level, the compensation capacitor is decoupled from the error amplifier by opening the first switch. In an embodiment, a second switch is coupled in parallel with the compensation capacitor, and the current-sensing circuit enables conductivity of the second switch to discharge the compensation capacitor upon detection of the current level greater than the threshold level. The second switch is opened upon detection of the current level less than the threshold level. In an embodiment, the current-sensing circuit controls an output current of the power converter at a current-limit level upon detection of the internal current level greater than the threshold level.

22 Claims, 2 Drawing Sheets

(56) References Cited

U.S. PATENT DOCUMENTS

2009/0115383 A1* 5/2009 Benes .......................... 323/280
2010/0148736 A1* 6/2010 Napravnik .................... 323/280

OTHER PUBLICATIONS

"MOST Recent, SMSC's Automotive Newsletter," SMSC Europe GmbH, Jul. 2007, pp. 1-10.

* cited by examiner

REGULATOR OVER-VOLTAGE PROTECTION CIRCUIT WITH REDUCED STANDBY CURRENT

CROSS-REFERENCE TO RELATED APPLICATION

This application claims the priority benefit of China Patent Application No. CN-200910265273.8, filed on Dec. 28, 2009, and entitled "An Over Voltage Protection Circuit of Regulator Without Stand-By Current," which is hereby incorporated by reference to the maximum extent allowable by law.

TECHNICAL FIELD

This disclosure relates generally to electronic power conversion, and more particularly to reducing a bias current level required by an error amplifier in a power converter, and a related method.

BACKGROUND

A power converter (also referred to as a "voltage regulator") is a power supply or power processing circuit that converts an input voltage waveform into a specified output voltage waveform. DC-DC power converters convert a direct current ("dc") input voltage into a dc output voltage. Controllers associated with the power converters manage a power converter operation by controlling conduction of power switches employed therein. Generally, the controllers are coupled between an input and output of the power converter in a feedback loop configuration (also referred to as a "control loop" or a "closed control loop").

Typically, the controller measures an output characteristic (e.g., an output voltage, an output current, or a combination of an output voltage and an output current) of the power converter, and based thereon, controls conduction of a power switch of the power converter. For example, in a power converter employing a linear regulator, i.e., a power converter circuit topology wherein a power switch is interposed between an input and an output of the power converter, the controller controls conductivity of the power switch within the linear region of the power switch's response curve, to regulate an output voltage of the power converter. In a power converter employing a switched-mode circuit topology, the controller controls a duty cycle of the power switch to regulate an output voltage. The duty cycle is a ratio represented by a conduction period of a power switch to a switching period thereof. Thus, if a power switch conducts for half of the switching period, the duty cycle for the power switch would be 50 percent. Additionally, as the voltage or the current for a load system dynamically changes due to a change in a system operating condition, the controller should be configured to dynamically increase or decrease the duty cycle of the power switches therein to maintain an output characteristic such as an output voltage at a desired value. A controller should also be responsive to an overload condition of the power converter, such as a short circuit coupled across an output thereof. A consideration for the design of such controllers is its response time for an overload condition, and overshoot of the output voltage that may produce an overvoltage condition when the short circuit is removed.

Turning now to FIG. 1 illustrated is a schematic drawing of a conventional standby power converter including a comparator to provide rapid shutdown of an internal pass transistor upon detection of an output voltage overvoltage condition. The circuit illustrated in FIG. 1 includes a "linear regulator" formed with p-type power MOSFET Q3 that controls the output voltage Vout at an output terminal of the regulator at a regulated voltage level. The conventional design illustrated in FIG. 1 is well understood in the art and will not be described further herein in the interest of brevity.

If overvoltage protection is not included in the circuit, design limitations of a conventional design may interact to produce a very high over-shoot condition for the regulator output voltage. A standby regulator is often used to supply a regulated voltage to a sensitive load circuit element such as a microprocessor control unit, and a high output over-shoot voltage can damage the load.

Systems, particularly portable systems such as notebook computers are frequently configured to operate in a standby mode to conserve energy delivered by a power source, which may be a battery. Such systems are frequently required to operate for an extended period of time in a standby mode, and minimizing power dissipation in the standby mode is often a key system characteristic that enables extended operation from a power source such as a battery. An overvoltage comparator that may be included in the circuit to detect an overshoot voltage generally consumes a significant level of standby current.

Providing low power dissipation in a standby mode for a power converter controller is a key success factor for such systems in the marketplace. Present system designs address this need with circuit components that draw a low level of bias current with attendant cost and performance compromises. The design of an improved arrangement to control a power converter, particularly in a standby mode, would address an unresolved application need.

SUMMARY

In accordance with an example embodiment and a related method, a power converter is formed with an error amplifier including a first switch coupled in series with an error amplifier compensation capacitor, wherein the compensation capacitor is decoupled from the error amplifier upon detection of a current level greater than a threshold level. In an embodiment, the compensation capacitor is decoupled from the error amplifier by opening the first switch. The error amplifier may be configured to sense an output voltage of the power converter. In an embodiment, the power converter includes a power switch, and the power switch is coupled to an output terminal of the power converter. The error amplifier is configured to control conductivity of the power switch to regulate an output characteristic of the power converter such as an output voltage. In an embodiment, the current level is sensed internal to the power converter. A current-sensing circuit senses the current and produces a signal to disable conductivity of the first switch upon detection of the current level greater than the threshold level. In an embodiment, the current-sensing circuit senses a current in the power switch to detect the current level greater than the threshold level.

The power converter may be formed with any of various power converter topologies such as a linear regulator circuit topology. The power switch is employed as a circuit component in the linear regulator, or as a switching element in a switched-mode power converter topology such as a buck topology.

In an embodiment, a second switch is coupled in parallel with the compensation capacitor, and the current-sensing circuit enables conductivity of the second switch upon detection of the current level greater than the threshold level. The second switch discharges the compensation capacitor upon the detection of the current level greater than the threshold level. Conductivity of the second switch is disabled upon detection of the current level less than the threshold level. In an embodiment, the current-sensing circuit controls an output current of the power converter at a current-limit level upon detection of the internal current level greater than the threshold level.

BRIEF DESCRIPTION OF THE DRAWINGS

The details of one or more embodiments of the disclosure are set forth in the accompanying drawings and the description below. In the figures, identical reference symbols generally designate the same component parts throughout the various views, and may be described only once in the interest of brevity. For a more complete understanding of the invention, reference is now made to the following descriptions taken in conjunction with the accompanying drawings, in which.

DETAILED DESCRIPTION OF ILLUSTRATIVE EMBODIMENTS

The making and using of the illustrative embodiments are discussed in detail below. It should be appreciated, however, that specific embodiments discussed are merely illustrative and do not limit the scope of the invention.

The present disclosure will be described with respect to illustrative embodiments, for example, a circuit and method to alter a response time of an error amplifier in a linear regulator in response to detection of a current level crossing a threshold level.

An embodiment of the disclosure may also be applied to other power converter arrangements, for example, to a power converter formed with a switched-mode power conversion topology. Further error-amplifier arrangements can be constructed and applied using processes introduced herein in different contexts using inventive concepts described herein, for example, a power converter employed to control the speed of a motor or to a power amplifier configured to amplify an audio signal.

Figure 1:
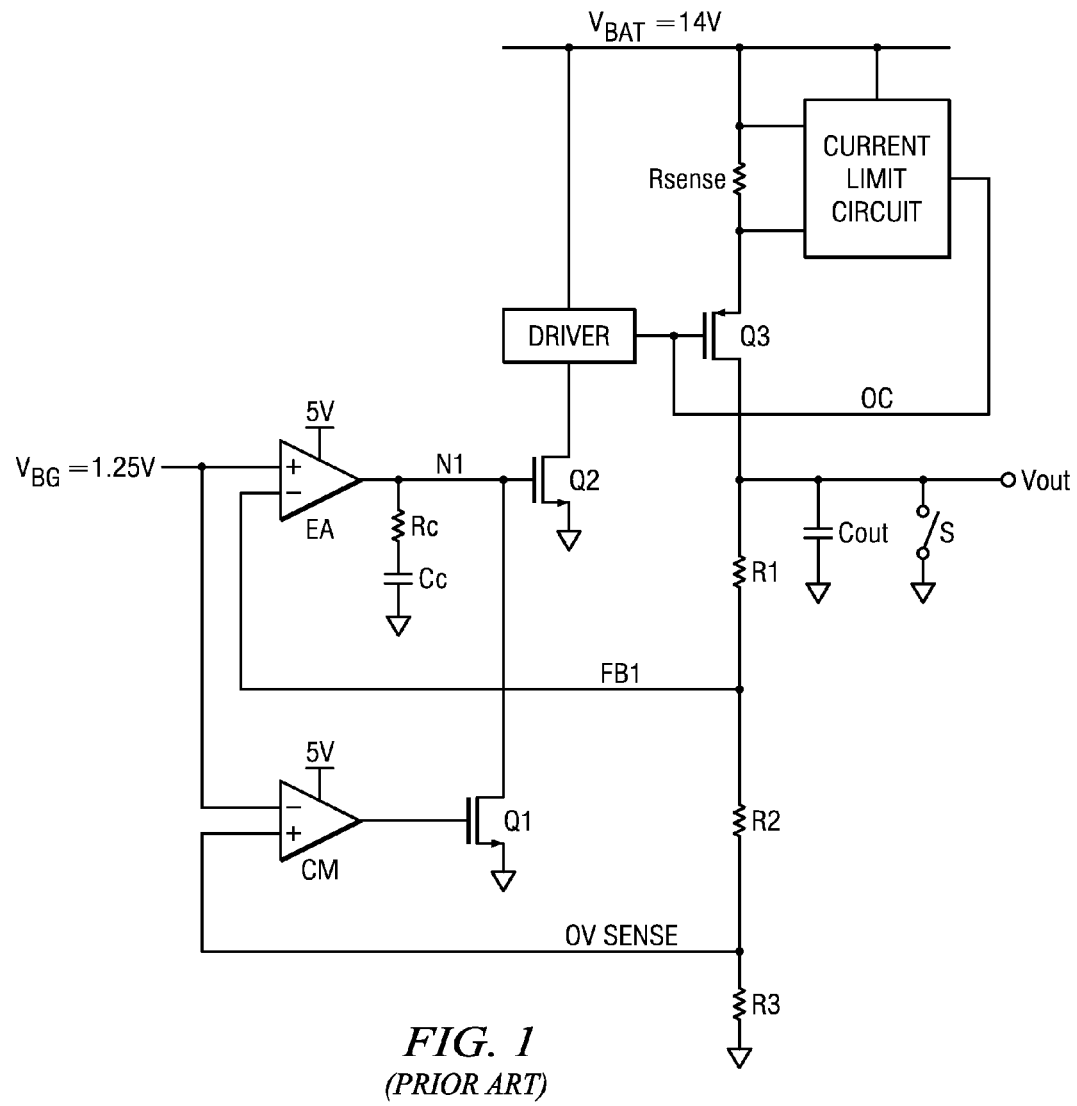
FIG. 1 illustrates a schematic drawing of a conventional standby power converter configured as a voltage regulator including a comparator to provide rapid shutdown of an internal pass transistor upon detection of an output voltage overvoltage condition.
Figure 2:
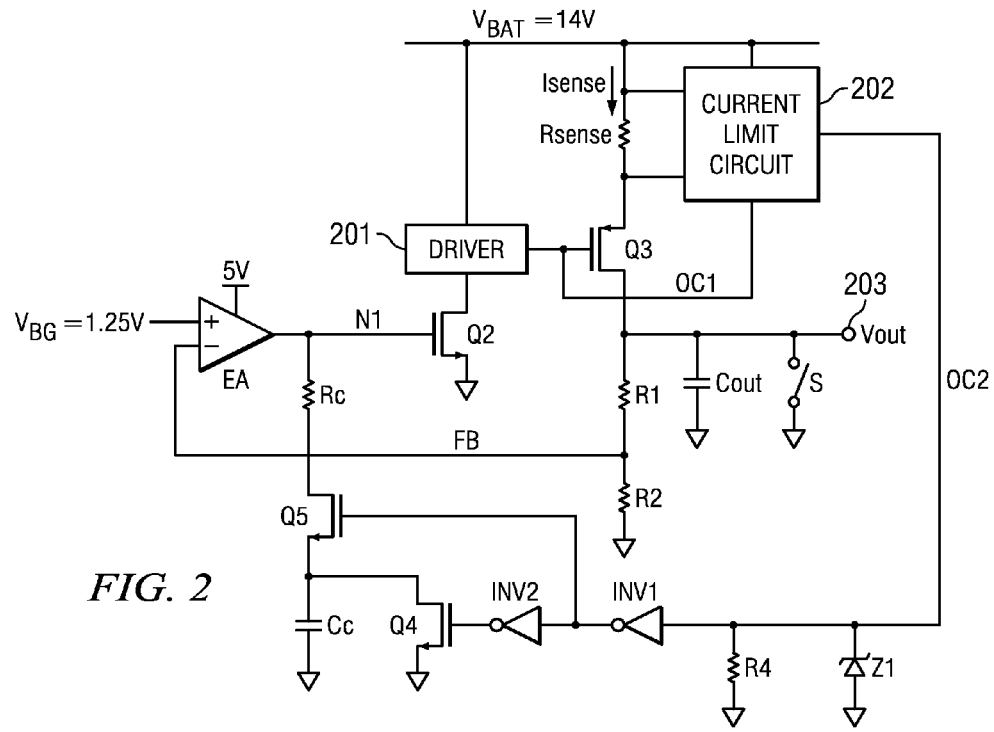
FIG. 2 illustrates a schematic drawing of a standby power converter configured as a voltage regulator including a switch configured to disconnect a compensation capacitor to provide rapid shutdown of a power transistor upon detection of an output overcurrent condition, constructed according to an embodiment.

Turning now to FIG. 2, illustrated is a schematic drawing of a standby power converter formed as a linear regulator including a switch Q5 configured to disconnect a compensation capacitor Cc in error amplifier EA to provide rapid shutdown of linear regulator power transistor Q3 upon detection of an output overcurrent condition. In an example embodiment, the circuit illustrated in FIG. 2 produces an output voltage Vout of 3.3 V from a bias voltage source $V_{BAT}$ of 14 V. In an alternative embodiment, a different output voltage such as an output voltage Vout of 5.0 V may be produced. The circuit that disconnects the compensation capacitor Cc from the output of error amplifier EA advantageously prevents the feedback control loop that senses an output voltage of the regulator at output terminals 203 from turning off power MOSFET Q3 too slowly due to the presence of compensation capacitor Cc. Slow turn-off of power MOSFET Q3 can produce an overshoot of the output voltage Vout, for example, upon removal of a short to ground from output terminal 203 as represented by opening the switch S. The standby voltage regulator introduced herein thus employs a switch Q5 to disconnect compensation capacitor Cc from the circuit upon detection of an overcurrent condition to speed up its response. The circuit is advantageously able to consume minimal standby current because no current flows from the node N1 through the compensation resistor Rc in a standby condition, unlike a conventional compensation circuit formed with a comparator.

The voltage regulator circuit illustrated in FIG. 2 includes a linear regulator formed with p-type power MOSFET Q3 that controls the output voltage Vout of the regulator at a regulated voltage level. A linear regulator controls an output voltage of a power converter by controlling a voltage drop across a power switch such as the MOSFET Q3. It is contemplated within the broad scope of the disclosure that other regulator topologies may be employed, such as a buck switching regulator, wherein an output voltage is regulated by controlling a switching duty cycle of a power switch. A resistor-divider network formed with resistors R1 and R2 provides a scaled feedback voltage FB derived from the output voltage Vout to the inverting input of error amplifier EA. The noninverting input of error amplifier EA is coupled to a bandgap reference $V_{BG}$, such as, without limitation, a 1.25 V bandgap reference. The error amplifier EA is powered from a 5 V bias voltage source. A bias voltage source providing another voltage level may also be used according to design requirements. Driver 201 and current limit circuit 202 are powered from the example 14V bias voltage source $V_{BAT}$. The 14 V bias voltage source $V_{BAT}$ also supplies current to the source of MOSFET Q3, which supplies the output current of the voltage regulator circuit.

The error amplifier EA provides a gate-drive signal to the gate of n-type MOSFET Q2, which in turn provides a control signal to the driver 201 that drives the gate of power MOSFET Q3. Gain and phase characteristics of the error amplifier EA are again influenced by compensation resistor Rc and compensation capacitor Cc. The current-limit circuit 202 senses a source current of power MOSFET Q3 with current-sense resistor Rsense to provide an overcurrent signal OC1 that is coupled to the gate of power MOSFET Q3. Upon detection of an overcurrent condition, the current limit circuit 202 clamps the gate of power MOSFET Q3 to a voltage level that enables MOSFET Q3 to conduct a short-circuit current determined by current limit circuit 202, thereby avoiding full turn-on of current flow in MOSFET Q3.

Current limit circuit 202 also provides the signal OC2 as an input to inverter INV1. The output of inverter INV1 is coupled to the input of inverter INV2 and to the gate of MOSFET Q5. The output of inverter INV2 is coupled to the gate of MOSFET Q4. If the output voltage Vout is shorted to ground as represented by closure of the switch S, then the signal OC2 is raised by the current limit circuit 202 to a level of, for example, 5 V. The signal OC2 is protected from a high-voltage and a negative voltage by Zener diode Z1. For example, if the high level of the signal OC2 is the voltage of the input bias voltage source Vbat, and the inverter INV1 is a circuit component with a maximum operating voltage of 5 V, then the Zener diode Z1 can be employed to clamp the signal OC2, which is assumed to be supplied with a high source impedance, to avoid breakdown of the input circuitry of the inverter INV1. Once the signal OC2 becomes inactive, resistor R4 can sink current, enabling the signal OC2 to quickly fall. The resistor R4, such as a resistor with resistance of the order of 10 kΩ, and the Zener diode Z1, such as a 5 V Zener diode, are optional circuit elements that can be omitted from a particular design depending on design requirements.

If the output voltage Vout is shorted to ground, the feedback control loop including the error amplifier EA with its inverting input coupled to the signal FB goes out of regulation, and circuit node N1 and the signal OC2 go high. One terminal of the compensation capacitor Cc will be disconnected by MOSFET Q5, and the voltage of circuit node N1 will be quickly reduced to ground level by error amplifier EA because circuit node N1 is now not coupled to compensation capacitor Cc. Circuit node N1 can exhibit a high slew rate due to its lack of capacitive loading by compensation capacitor Cc. Inverter INV2 turns on MOSFET Q4 when MOSFET Q5 is disconnected, thereby discharging compensation capacitor Cc. When the short to ground is removed, the output capacitor Cout is charged and the output voltage Vout increases. If the output voltage Vout increases to a level higher than the desired regulated voltage level, the voltage level of circuit node N1 will quickly decrease, again because circuit node N1 is not coupled to compensation capacitor Cc, and the current Isense that passes through power MOSFET Q3 will be quickly reduced below the short-circuit level. In this manner, the feedback control loop quickly returns to normal circuit operation in response to the signal FB The signal OC2 immediately transitions to 0 V when the short-circuit current is cleared. MOSFET Q5 is turned on by inverter INV1, reconnecting capacitor Cc to circuit node N1 through the compensation resistor Rc to provide normal compensation for the feedback loop. Inverter INV2 turns off MOSFET Q4, thereby removing a low-impedance path in parallel with capacitor Cc. The feedback control loop quickly resumes normal operation. The net result is a very small overshoot of the output voltage Vout with an error amplifier that draws a low bias current.

Figure 3:
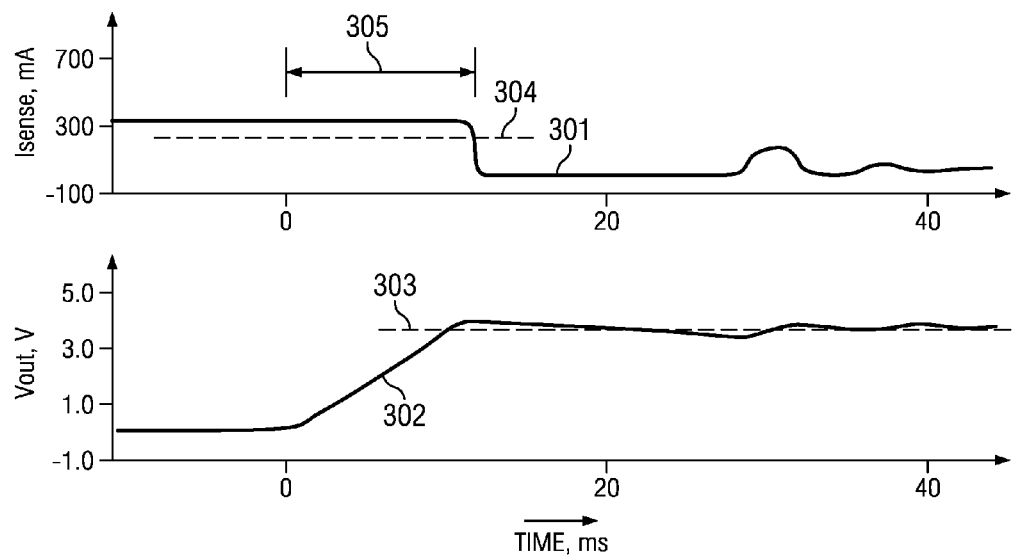
FIG. 3 illustrates a graphical representation of output voltage and a resulting current upon removal of a short circuit between an output terminal and local circuit ground for the circuit illustrated in FIG. 2.

Turning now to FIG. 3, illustrated is a graphical representation of the output voltage Vout and the current Isense that flows through the current-sense resistor Rsense upon removal at time t=0 of a short circuit between output terminal 203 (illustrated in FIG. 2), and local circuit ground. Removal of such a short circuit can be represented by opening of the switch S (illustrated in FIG. 2.) During the period of time when the current Isense exceeds a threshold level, such as the level represented by the dashed line 304, the output signal of the inverter INV1 is low, disabling conductivity of MOSFET Q5, and the output signal of inverter INV2 is high, turning on MOSFET Q4. Accordingly, the compensation capacitor Cc is disconnected from the circuit by MOSFET Q5, and the compensation capacitor Cc is discharged by MOSFET Q4. Disconnection of the compensation capacitor Cc substantially shortens the response time of error amplifier EA, enabling the output voltage Vout to be rapidly increased, as illustrated by the curve 302, charging the output capacitor Cout. Substantial current is required to charge the output capacitor Cout, as indicated by the curve 301 during the interval of time 305, as observed in the increase of the output voltage Vout after time t=0. As the output voltage Vout approaches the steady-state value represented by the dashed line 303, the current Isense quickly falls to its steady-state value at roughly 14 ms, with some small ringing at approximately 30 ms. The output voltage Vout illustrated in FIG. 3 exhibits minimal overshoot and rapid response time compared to simulation of corresponding circuits without the MOSFETs Q4 and Q5 and associated control circuitry.

An embodiment has been introduced of constructing a power converter with an error amplifier, wherein a first switch is coupled in series with a compensation capacitor in the error amplifier, and the compensation capacitor is decoupled from the error amplifier by opening the first switch upon detection of a current level in the power converter greater than a threshold level. A current-sensing circuit is configured to sense a current in the power converter, and the current-sensing circuit is configured to produce a signal to open the first switch upon detection of the current level in the power converter greater than the threshold level. In an embodiment, the error amplifier is configured to sense an output voltage of the power converter. In a further embodiment, a power switch is coupled to an output terminal of the power converter, and the error amplifier is configured to control conductivity of the power switch to regulate the output voltage of the power converter. In an embodiment, the current-sensing circuit is configured to sense a current in the power switch to detect the current level greater than the threshold level. In an embodiment, the power converter employs a linear regulator circuit topology to produce the output voltage, and the power switch is employed as a controlled voltage-dropping circuit component in the linear regulator.

In a further embodiment, a second switch is coupled in parallel with the compensation capacitor, and the current-sensing circuit is configured to enable conductivity of the second switch upon detection of the current level greater than the threshold level. In an embodiment, the second switch is configured to discharge the compensation capacitor upon the detection of the current level greater than the threshold level. In a further embodiment, the second switch is opened upon detection of the current level less than the threshold level. In a further embodiment, a compensation resistor is coupled in series with the compensation capacitor and the first switch. In an embodiment, the current-sensing circuit is configured to control an output current of the power converter at a current-limit level upon detection of the internal current level greater than the threshold level.

Another example embodiment provides a method of controlling a power converter. The method includes sensing an output voltage of the power converter with an error amplifier formed with a compensation capacitor, coupling a first switch in series with the compensation capacitor, sensing an internal current level of the power converter, and disabling conductivity of the first switch upon the sensing of the internal current level greater than a threshold level.

In an embodiment, the method includes sensing an output voltage of the power converter with the error amplifier. In a further embodiment, the method includes coupling a power switch to an output terminal of the power converter, and controlling conductivity of the power switch with the error amplifier to regulate the output voltage of the power converter. In an embodiment, a current in the power switch is sensed to sense the internal current level of the power converter. In an embodiment, the power converter is formed with a linear regulator, and the linear regulator includes the power switch as a circuit component.

In a further embodiment, the method includes coupling a second switch in parallel with the compensation capacitor, and enabling conductivity of the second switch upon the sensing of the internal current level greater than the threshold level. In an embodiment, the method includes opening the second switch upon detection of the current level less than the threshold level. In an embodiment, the second switch discharges the compensation capacitor upon the sensing of the internal current level greater than the threshold level. In a further embodiment, the method includes coupling a compensation resistor in series with the compensation capacitor and the first switch. In a further embodiment, the method includes controlling an output current of the power converter upon detection of the internal current level greater than the threshold level.

Another example embodiment provides a power converter constructed with a regulator coupled to bias voltage source to produce a regulated output voltage. An error amplifier is formed with an input coupled to the output voltage and a compensation capacitor coupled to its output. A switch is coupled in series with the compensation capacitor, and a current-sensing circuit is configured to sense a current level in the linear regulator and to produce a signal to disable conductivity of the switch upon detection of the current level greater than a threshold level.

Although processes to decouple a compensation capacitor from an error amplifier and related methods have been described for application to a power converter, it should be understood that other applications of these processes such as for a motor controller or a power amplifier are contemplated within the broad scope of the invention, and need not be limited to power converter applications employing processes introduced herein.

Although the disclosure has been shown and described primarily in connection with specific example embodiments, it should be understood by those skilled in the art that diverse changes in the configuration and the details thereof can be made without departing from the essence and scope of the invention as defined by the claims below. The scope of the invention is therefore determined by the appended claims, and the intention is for all alterations that lie within the range of the meaning and the range of equivalence of the claims to be encompassed by the claims.

What is claimed is:

1. A power converter comprising:
   an error amplifier including a compensation capacitor;
   a first switch coupled in series with the compensation capacitor; and
   a current-sensing circuit configured to produce a signal to disable conductivity of the first switch upon detection of an internal current level greater than a threshold level, wherein the current-sensing circuit is configured to control an output current of the power converter at a current-limit level upon detection of the internal current level greater than the threshold level.

2. The power converter as claimed in claim 1, wherein the error amplifier is configured to sense an output voltage of the power converter.

3. The power converter as claimed in claim 2, further comprising a power switch coupled to an output terminal of the power converter, wherein the error amplifier is configured to control conductivity of the power switch to regulate the output voltage of the power converter.

4. The power converter as claimed in claim 3, wherein the current-sensing circuit is configured to sense a current in the power switch.

5. The power converter as claimed in claim 3, wherein the power converter is configured as a linear regulator.

6. The power converter as claimed in claim 1, further comprising a second switch coupled in parallel with the compensation capacitor, wherein the current-sensing circuit is configured to enable conductivity of the second switch upon detection of the current level greater than the threshold level.

7. A power converter comprising:
   an error amplifier including a compensation capacitor;
   a first switch coupled in series with the compensation capacitor;
   a current-sensing circuit configured to produce a signal to disable conductivity of the first switch upon detection of an internal current level greater than a threshold level; and
   a second switch coupled in parallel with the compensation capacitor, wherein the current-sensing circuit is configured to enable conductivity of the second switch upon detection of the current level greater than the threshold level, wherein the second switch is configured to discharge the compensation capacitor upon the detection of the current level greater than the threshold level.

8. The power converter as claimed in claim 7, wherein the second switch is configured to be non-conducting upon detection of the current level less than the threshold level.

9. The power converter as claimed in claim 1, further comprising a compensation resistor coupled in series with the compensation capacitor and the first switch.

10. A method of controlling a power converter, the method comprising:
    sensing an output voltage of the power converter with an error amplifier, formed with a compensation capacitor, sensing an internal current level of the power converter;
    disabling conductivity of a first switch coupled in series with the compensation capacitor, upon the sensing of the internal current level greater than a threshold level; and
    controlling an output current of the power converter upon detection of the internal current level greater than the threshold level.

11. The method as claimed in claim 10, further comprising controlling conductivity of a power switch coupled to an output terminal of the power converter, with the error amplifier to regulate the output voltage of the power converter.

12. The method as claimed in claim 11, wherein sensing the internal current level of the power converter comprises sensing a current in the power switch.

13. The method as claimed in claim 11, wherein the conductivity of the power switch is controlled within a linear region of the response curve of the power switch.

14. The method as claimed in claim 10, further comprising enabling conductivity of a second switch coupled in parallel with the compensation capacitor, upon the sensing of the internal current level greater than the threshold level.

15. The method as claimed in claim 14, further comprising disabling conductivity of the second switch upon detection of the internal current level less than the threshold level.

16. A method of controlling a power converter, the method comprising:
    sensing an output voltage of the power converter with an error amplifier, formed with a compensation capacitor, sensing an internal current level of the power converter;
    disabling conductivity of a first switch coupled in series with the compensation capacitor, upon the sensing of the internal current level greater than a threshold level; and
    enabling conductivity of a second switch coupled in parallel with the compensation capacitor, upon the sensing of the internal current level greater than the threshold level, wherein the compensation capacitor discharges through the second switch when the conductivity of the second switch is enabled.

17. A power converter comprising:
    a regulator coupled to a bias voltage source and configured to produce a regulated output voltage on an output voltage terminal;
    an error amplifier with a first input coupled to the output voltage terminal;

a compensation capacitor having a first terminal and a second terminal, the second terminal coupled to a first reference supply;

a first switch coupled in series with the compensation capacitor between the first terminal and the error amplifier;

a second switch having a conduction path that couples the first terminal to the second terminal; and a current-sensing circuit coupled to a control input of the regulator, to a control terminal of the first switch, and to a control terminal of the second switch, wherein the current-sensing circuit is configured to sense a current level in the regulator and to produce control signals for the regulator, the first switch, and the second switch based on the current level.

18. The power converter of claim 17, wherein the power converter converts an input direct current (DC) voltage to an output direct current (DC) voltage.

19. The power converter of claim 17, wherein the first input of the error amplifier is coupled to the output voltage terminal through a resistive divider circuit.

20. The power converter of claim 17, wherein a second input of the error amplifier is coupled to a bandgap reference voltage.

21. The power converter of claim 17, wherein the regulator comprises:

a first transistor having a conduction path coupled between the bias voltage source and the output voltage terminal and having a control terminal coupled to the control input of the regulator, the control input coupled to the current-sensing circuit;

a driver coupled to the bias voltage source and to the control terminal of the first transistor; and a second transistor having a conduction path coupled between a control terminal of the driver and a second reference supply and having a control terminal coupled an output of the error amplifier.

22. The power converter of claim 17, wherein the current-sensing circuit is coupled to the control terminal of the first switch through a first inverter and the current-sensing circuit is coupled to the control terminal of the second switch through the first inverter and a second inverter.

* * * * *

UNITED STATES PATENT AND TRADEMARK OFFICE
CERTIFICATE OF CORRECTION

| | |
|---|---|
| PATENT NO. | : 8,947,060 B2 |
| APPLICATION NO. | : 12/953392 |
| DATED | : February 3, 2015 |
| INVENTOR(S) | : Da Song Lin |

It is certified that error appears in the above-identified patent and that said Letters Patent is hereby corrected as shown below:

In the Claims

In Col. 10, lines 14 - 15, claim 21, delete "coupled an output" and insert --coupled to an output--.

Signed and Sealed this
Second Day of June, 2015

Michelle K. Lee
*Director of the United States Patent and Trademark Office*